June 12, 1956     P. D. BERMINGHAM     2,750,214
TWO-PIECE FLUID SEAL
Filed Jan. 19, 1952

PETER D. BERMINGHAM
*INVENTOR.*

BY J. William Freeman
ATTORNEY

United States Patent Office 2,750,214
Patented June 12, 1956

2,750,214

TWO-PIECE FLUID SEAL

Peter D. Bermingham, Suffield, Ohio

Application January 19, 1952, Serial No. 267,257

9 Claims. (Cl. 286—10)

This invention relates to sealing devices and in particular relates to sealing devices used to effectuate a fluid-tight connection between relatively rotating members.

Originally, initial attempts at effectuating a seal between a rotating shaft and a surrounding stationary member, were directed toward the use of packing material inserted in the slight space provided between the respective members. In addition to possessing a relatively short life span, this form of seal had the further disadvantage of not being able to withstand any appreciable degree of pressure.

Accordingly, the next efforts were directed towards the use of "wiper type" seals which essentially comprised a resilient member fixed on the stationary surface and designed to have frictional contact with the revolving shaft. The principal disadvantage of this type of seal was found in the wear caused on the rotating shaft. Specifically, it was found that a definite groove would be worn in the shaft notwithstanding the fact that the material of the wiper element was made of resilient material.

Present day seals, almost without exception, have comprised improvements on the "wiper type" seal by use of additional parts designed to increase the amount of sealing pressure exerted on the shaft. In many cases, failure of certain of these additional parts has resulted in fragmentary portions of the seal being carried into the machinery being lubricated, with a costly breakdown of the machinery resulting.

It is one object of this invention to provide an oil seal wherein the actual sealing is accomplished within the sealing mechanism itself.

It is a further object of this invention to provide a sealing unit wherein the degree of sealing effectiveness is directly proportional to the speed of rotation between the relatively rotating members.

It is a further object of this invention to provide a sealing unit wherein misalignment of the rotating member with respect to the stationary surrounding surface will not affect operation of the sealing unit.

It is a further object of this invention to provide a self-contained sealing unit comprising a minimum number of component parts, and being of initial low cost and possessing extremely long life.

It is a further object of this invention to provide a sealing unit which is self-lubricating.

It is a further object of this invention to provide a sealing unit wherein an auxiliary sealing action is provided in addition to the primary sealing action.

It is a further object of this invention to provide a sealing unit having means therein for doubling the life of the primary seal.

It is a still further object of this invention to provide a sealing unit having means thereon for preventing the entrance of foreign matter into the part being sealed.

Other objects of the invention will become apparent upon consideration of the specification and the accompanying drawings.

Figure 1:
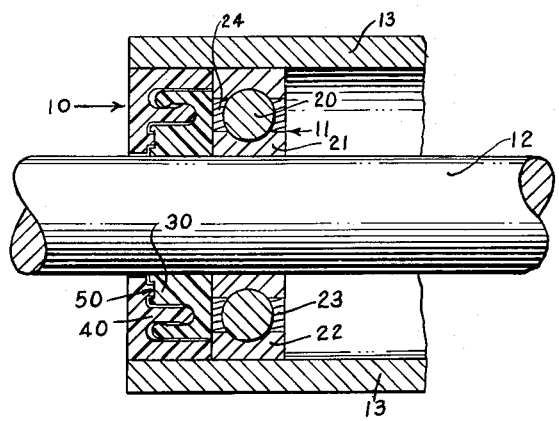
Figure 1 is a side elevation, partly broken away and in section, showing an installation incorporating the use of the improved sealing device.
Figure 2:
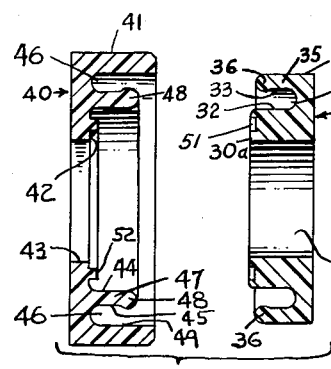
Figure 2 is an exploded cross-sectional view of the component parts of the sealing unit.

Referring now to the drawings and in particular to Figure 1 thereof, the sealing unit, generally indicated as 10, and an adjacently positioned ball bearing unit 11, are shown mounted between a rotating shaft 12 and a relatively stationary surrounding housing 13, the arrangement of the parts being such that the ball bearing unit 11 facilitates movement of the shaft 12 within the housing 13, while the sealing unit 10 prevents escape of any lubricating fluid from the interior of the housing 13.

Because the construction of the ball bearing unit 11 does not directly affect the operation of the sealing unit 10, it is manifest that any one of several types of ball bearing assemblies could be employed in the installation shown in Figure 1, without materially affecting the operation of the same. Accordingly, the standard ball bearing assembly shown in Figure 1 comprises a plurality of hardened steel balls 20, 20, receivable within inner and outer raceway members 21 and 22, which are fixedly positioned, with respect to the shaft 12 and the housing 13, respectively. Retaining rings 23 and 24 serve to align the balls 20, 20, in proper position between raceway members 21 and 22, respectively.

The sealing unit, per se, which has been generally designated as 10, comprises relatively rotatable registering male and female sealing elements 30 and 40, respectively, retained in rotatable sealing relationship with each other, while guide means 50 serve to align the sealing elements 30 and 40 in a manner to be described.

To this end, the male sealing element 30 includes a centrally apertured sealing plate of circular cross-section receivable upon the shaft 12 in press-fit relationship and having one face 30a thereof provided with a relatively deep annular groove 31 having sidewall portions 32 and 33. The sidewall portion 33 together with the exteriorly-presented peripheral portion 34 of the male sealing element 30 defines an annular rib 35 having the freely-presented end portion thereof equipped with a bulbous portion 36 which serves to restrict the opening of the groove 31 for purposes to be described later.

Similarly, the female sealing element 40, includes a centrally-apertured sealing plate of circular cross-section having the exteriorly-presented peripheral portion 41 thereof receivable within the surrounding stationary housing 13 in press-fit relationship. While the overall thickness of the female sealing element 40 approximates that of the male sealing element 30, the female sealing element 40 is provided with a circular cavity 42, extending radially outwardly from the central aperture 43 thereof and having its depth defined by a sidewall 44, which, together with a sidewall portion 45 of a relatively deep annular groove 46, forms an annular rib 47, the freely-presented end of which is provided with a bulbous portion 48 which operates to restrict the opening of the groove 46. The radial spacing of the annular rib 47 is such that it is designed for reception within the groove 31 of the male sealing element 30 while the groove 46 is spaced in such a manner that it may receive the annular rib 35 of the male sealing element 30 in registering relationship (see Figure 1). Registration of the male and female sealing elements 30 and 40 with each other is maintained by virtue of the bulbous portions 36 and 48 provided on ribs 35 and 47 respectively.

For the dual purpose of aligning the respectively rotating members 30 and 40 and preventing the entrance of foreign matter into the sealing unit 10, the face 30a of the male sealing element is provided with an annular groove 51 for reception therein of an annular rib 52 provided on the face of the cavity 42. (See Figure 1.)

In use or operation of the improved sealing unit for effectuating a fluid-tight connection between a rotating shaft 12 and a relatively stationary surrounding housing 13, the same may first be assembled into a unit by snapping the rib 35 of the male sealing unit 30 into the groove 46 of the female sealing unit 40. By this action it is manifest that the rib 47 will be automatically received within the groove 31.

With the sealing unit thus assembled, the same may then be urged into position between the shaft 12 and the relatively stationary surrounding housing 13, with the peripheral portion 41 of the female sealing element 40 and the aperture 37 of the male sealing element 30 frictionally engaging the housing 13 and shaft 12, respectively.

In this position, rotation of the shaft 12 will cause relative rotation to occur between the sealing elements 30 and 40 and sealing points will be established: (1) between the bulbous portion 36 and the sidewall 45, and (2) between the bulbous portion 48 and the sidewall 33. In actual practice, it has been found advantageous to make the bulbous portion 48 slightly larger than the bulbous portion 36, thereby temporarily avoiding sealing contact between the bulbous portion 36 and the sidewall 45 until such time as the frictional wear has reduced the bulbous portion 48 to the point where an effective seal cannot be maintained between the same and the sidewall 33. At this point it is manifest that the main sealing action will occur between the bulbous portion 36 and the sidewall 45 (see Figure 3).

By the same token, it is manifest that an auxiliary sealing action is presented between the two aforementioned sealing points by virtue of the centrifugal force exerted on any liquid entrapped in the space between these two points, which centrifugal force operates, to force the entrapped liquid against the sidewall 33 in sealing relationship.

Figure 3:
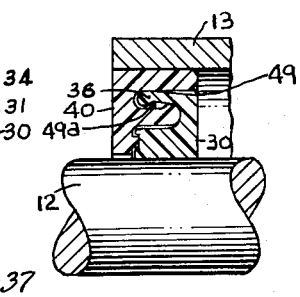
Figure 3 is an enlarged fragmentary cross-section of the device operating at extremely high speed.

In installations requiring exceptionally high rotation speed of the shaft 12, the rib 35 may also be effected by the centrifugal force inherent with such an operation with the end result that the same may be distorted to the position shown in Figure 3. In this position, it is manifest that the bulbous portion 36 will engage the sidewall 49 instead of the sidewall 45 and cause formation of a capillary seal 49a.

It will be seen from the foregoing that a new and novel approach has been made to the problem of effectuating a fluid-tight seal between a rotating member and a relatively stationary surrounding surface, which approach features the use of either or both of two primary sealing points, together with an auxiliary sealing action based on an entirely different principle, and which is not affected by misalignment of the parts being sealed.

Figure 4:
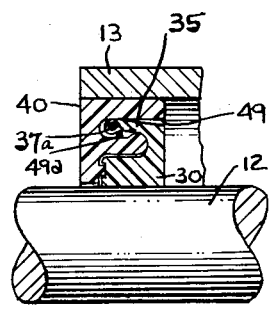
Figure 4 is a view similar to Figure 3 but illustrating a modified form of the invention.

In the modified form of the invention shown in Figure 4, the basic sealing mechanism is substantially the same as previously set forth with the exception that bulbous portion is weighted as at 37a, with mercury or some other equally heavy material. In this modified form of the invention, designed for use at exceptionally high shaft speeds, provision of a weighted rib 35 increases the reaction of the same against the sidewall 49 with an increased sealing pressure being maintained by virtue of the centrifugal force exerted thereon.

Figure 5:
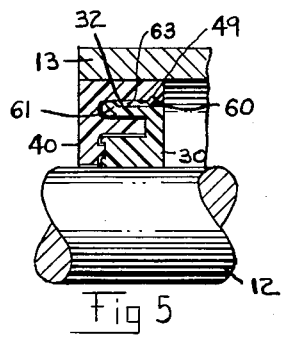
Figure 5 is a fragmentary, cross-sectional view of a modified form of the invention.

In Figure 5 there is illustrated a modified form of the invention, wherein the bulbous portions 60 and 61 extend from sidewalls 49 and 32 respectively in a different arrangement of the grooves and ribs of the sealing elements 30 and 40. As a consequence of this reversing, the labyrinth 63 is presented above rib 35 instead of below and the modification places greater emphasis on centrifugal force.

Figure 6:
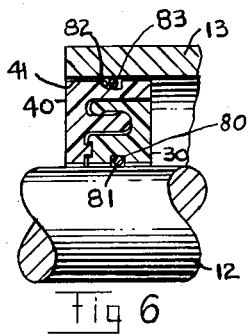
Figure 6 is a fragmentary cross-sectional view of another modified form of the invention.

In Figure 6 there is illustrated an improved form of the invention designed for use in installations where a press-fit with either the shaft or the stationary surface is undesirable. In accordance with this thought, the male sealing element 30 is provided with an annular groove 80 having an annular ring 81 therein for effectuating a seal between the shaft 12 and the male sealing element 30. A similar groove 82 is provided on the surface 41 of the female sealing element 40 for reception therein of an annular ring 83 which serves to effectuate a seal between the female sealing element 40 and the surrounding housing 13.

Other modifications may be resorted to without deviating from the spirit thereof or the scope of the appended claims.

What is claimed is:

1. A mechanical seal for establishing a fluid-tight connection between a rotatable member and a relatively stationary member operably aligned therewith, comprising; a first sealing plate, fixed with respect to one of said members and having one radial face thereof provided with an annular groove having a side wall; an annular rib on said first sealing plate, one side wall of which is common to said side wall of said groove; a second sealing plate, fixed with respect to the other of said members and having one radial face thereof provided with an annular groove having a side wall; said last-mentioned groove telescopically receiving therein said rib of said first sealing plate; a second annular rib on said second sealing plate, telescopically receivable within said groove of said first sealing plate and having a side wall that is common to said side wall of said groove in said second sealing plate; and radially extending projections provided on the free ends of said annular ribs, whereby the mouth openings of both grooves in both sealing plates are restricted; said projections being axially spaced when said sealing plates are telescoped, whereby an annular chamber is defined interiorly of said telescoped sealing plates by contact between said ribs; said projection of one of said ribs contacting a surface of the other of said ribs in each case.

2. A device as set forth in claim 1, further characterized by the fact that said projection on said rib of said first sealing plate is larger than the projection on said rib of said second sealing plate, whereby the contact between the smaller of said projections and the surface of the rib of the first sealing plate is temporarily broken until such time as friction reduces the size of said larger projection.

3. A mechanical seal for establishing a fluid-tight connection between a rotatable member and a relatively stationary member operably aligned therewith, comprising; an apertured sealing plate fixed with respect to one of said members and having an annular groove therein that has a radially restricted mouth opening; a second concentric sealing plate, fixed with respect to the other of said members and being provided with an annular rib that includes an enlarged bulbous tip portion projecting radially from the free end thereof for telescopic reception in said groove; the radial width of said tip portion being greater than the radial width of said restricted mouth opening of said groove in said apertured sealing plate, whereby said bulbous tip portion of said second sealing plate may be telescopically received in said groove of said first-mentioned sealing plate in locked reception therein upon telescoping movement of said tip portion past said restricted mouth opening of said groove in said first-mentioned sealing plate.

4. A mechanical seal, comprising; a first sealing plate, having one radial face thereof provided with an annular groove having a side wall; an annular rib on said first sealing plate, one side wall of which is common to said side wall of said groove; a second sealing plate, relatively rotatable to said first sealing plate and having one radial face thereof provided with an annular groove having a side wall; said last-mentioned groove telescopically receiving therein said rib of said first sealing plate; a second annular rib on said second sealing plate, telescopically receivable within said groove of said first sealing plate and having a side wall that is common to said side wall of said groove in said second sealing plate; and radially extending projections provided on the free ends of said annular ribs, whereby the mouth openings of both grooves in both sealing plates are restricted; said projections being axially spaced when said sealing plates are telescoped, whereby an annular chamber is defined interiorly of said telescoped sealing plates by tensional contact between said ribs; said projection of one of said ribs tensionally contacting a surface of the other of said ribs in each case.

5. A mechanical seal, comprising; a first sealing plate having one radial face thereof provided with an annular groove of reduced mouth opening that is defined by radially spaced side walls and an annular projection that extends radially from one of said side walls of said groove to restrict the radial width of said groove at the mouth opening thereof; a second sealing plate, concentrically disposed about the axis of said first sealing plate and being relatively rotatable thereto, said second sealing plate having an axially extending annular rib with a radially enlarged free end thereof telescopically receivable within said groove of said first sealing plate; said radially enlarged free end of said rib being of greater radial width than the reduced mouth opening of said groove in said first sealing plate; and at least one side wall of said groove being radially resilient, whereby said radially enlarged free end of said rib can be axially telescoped past the reduced mouth opening of said groove upon deflection of said resilient side wall of said groove of said first sealing plate.

6. The device of claim 5 further characterized by the presence of means operable between said sealing plates to prevent relative radial movement therebetween.

7. A mechanical seal of the character described, comprising; a first sealing element having an axially extending cylindrical sealing surface thereof adjoining a contiguous sealing projection of increased radial diameter; a second sealing element, relatively rotatable with respect to said first sealing element and having an axially extending cylindrical sealing surface that is radially outwardly spaced from said first-mentioned sealing surface and which adjoins a contiguous sealing projection of decreased radial diameter; said sealing projections being respectively engageable in sealing engagement with said radially spaced, axially extending sealing surfaces of said sealing elements, and also being axially spaced when engageable with said sealing surfaces, whereby an annular chamber is defined by said projections and said axially extending sealing surfaces.

8. The seal of claim 1, further characterized by the fact that at least one of said projections is weighted.

9. The seal of claim 1, further characterized by the fact that at least one of said sealing plates has an O-ring disposed in the surface thereof that is adjacent the member to which the same is fixed.

References Cited in the file of this patent

UNITED STATES PATENTS

| | | |
|---|---|---|
| 1,189,853 | Modler | July 4, 1916 |
| 1,316,964 | London | Sept. 23, 1919 |
| 1,326,690 | Rice | Dec. 30, 1919 |
| 1,386,865 | Heisler | Aug. 9, 1921 |
| 1,718,175 | Nilson | June 18, 1929 |
| 1,908,804 | Wiberg | May 16, 1933 |
| 2,210,543 | Cox | Aug. 6, 1940 |

FOREIGN PATENTS

| | | |
|---|---|---|
| 977,163 | France | of 1950 |